United States Patent
Kar

(10) Patent No.: US 11,648,605 B2
(45) Date of Patent: May 16, 2023

(54) HALLOYSITE TUBES IN ESTER-CURED PHENOLIC BONDED FOUNDRY SHAPES

(71) Applicant: ASK Chemicals LLC, Wilmington, DE (US)

(72) Inventor: Sritama Kar, Dublin, OH (US)

(73) Assignee: ASK Chemicals LLC, Wilmington, DE (US)

( * ) Notice: Subject to any disclaimer, the term of this patent is extended or adjusted under 35 U.S.C. 154(b) by 61 days.

(21) Appl. No.: 17/316,033

(22) Filed: May 10, 2021

(65) Prior Publication Data

US 2022/0355367 A1  Nov. 10, 2022

(51) Int. Cl.

| | | |
|---|---|---|
| *B22C 1/22* | (2006.01) | |
| *C04B 14/04* | (2006.01) | |
| *C04B 14/06* | (2006.01) | |
| *C08G 16/02* | (2006.01) | |

(52) U.S. Cl.
CPC .......... *B22C 1/2253* (2013.01); *C04B 14/044* (2013.01); *C04B 14/06* (2013.01); *C08G 16/0225* (2013.01)

(58) Field of Classification Search
CPC .......... B22C 1/16; B22C 1/167; B22C 1/186; B22C 1/2253; B22C 1/10; C04B 14/041; C04B 14/06; C04B 14/10
See application file for complete search history.

(56) References Cited

U.S. PATENT DOCUMENTS

| | | |
|---|---|---|
| 4,780,489 A | 10/1988 | Dunnavant et al. |
| 5,238,976 A | 8/1993 | Iyer |
| 5,376,696 A | 12/1994 | Dunnavant et al. |
| 5,424,376 A | 6/1995 | Chang et al. |
| 5,567,743 A | 10/1996 | Busby et al. |
| 5,616,631 A | 4/1997 | Kiuchi et al. |
| 5,711,792 A * | 1/1998 | Miller ...................... B22C 1/185 264/225 |
| 5,859,091 A * | 1/1999 | Chen .................. C08G 18/6674 524/590 |
| 5,874,487 A * | 2/1999 | Singh .................... B22C 1/2273 523/143 |
| 6,286,580 B1 | 9/2001 | Ward et al. |
| 6,602,931 B2 | 8/2003 | Chen et al. |
| 9,416,299 B2 | 8/2016 | Kropp et al. |
| 2005/0250872 A1 | 11/2005 | Fox et al. |
| 2007/0173550 A1 | 7/2007 | Busby |
| 2010/0252226 A1 | 10/2010 | Bangcuyo et al. |
| 2019/0382559 A1 | 12/2019 | Condo et al. |
| 2022/0048822 A1* | 2/2022 | Perronnet ............... C04B 38/02 |

OTHER PUBLICATIONS

Ye et al., High Impact Strength Epoxy Nanocomposites with Natural Nanotubes, Elsevier, Science Direct article, Aug. 19, 2007, 8 pages.

* cited by examiner

*Primary Examiner* — Hoa (Holly) Le
(74) *Attorney, Agent, or Firm* — Standley Law Group LLP; Jeffrey S. Standley; Kenny W. Pung

(57) ABSTRACT

A no bake process is provided for preparing a foundry shape. A major amount of an appropriate foundry aggregate, especially a sand that has been mechanically-reclaimed, is mixed with an amount of halloysite tubes. A binder system, especially a water-based binder, such as an aqueous alkaline phenolic resole resin, is added to the mixed aggregate and halloysite, and a liquid co-reactant for curing the binder is also added. By intimately mixing the components, a foundry molding compound is formed and it can be placed into a mold or patter to cure into a foundry shape. When removed from the mold or pattern, the foundry shape can be used to cast molten metal.

15 Claims, No Drawings

HALLOYSITE TUBES IN ESTER-CURED PHENOLIC BONDED FOUNDRY SHAPES

CROSS-REFERENCE TO RELATED APPLICATIONS

This application is a non-provisional application that makes no priority claim.

TECHNICAL FIELD

This disclosure relates to an additive for a system used for making foundry shapes to cast metal parts. A binder system based on an alkaline solution of phenolic resins is contacted with a foundry mix containing an appropriate foundry aggregate, especially sand, to form foundry shapes. The foundry shapes are cured with an ester co-reactant, using a "no-bake" or "cold box" process, depending upon the volatility of the ester. Using a portion of halloysite nanotubes as the additive is effective in improving tensile strength, especially when the foundry aggregate contains reclaimed material. Including an effective amount of halloysite nanotubes as an additive to the foundry aggregate provides unexpectedly good tensile strength.

BACKGROUND

The casting of metal parts using a mold or core formed from a refractory material is ancient. The art of metal casting has been improved in the past few centuries by the improvements in binder systems for making a stable foundry shape, especially using organic polymer binders.

In a foundry shape, the foundry aggregate comprises a major percentage of the weight. Beyond the need to break down the foundry shape to remove the cast part, the economics mandate that foundry aggregate must be "reclaimed" after use. Virgin aggregate is costly and used aggregate can no longer be readily disposed of, due to contamination from, among other things, the resin coating. Further, to be reused, agglomerated aggregate must be broken down into individual particles. When reclaimed foundry aggregate is used to form a foundry shape with a phenolic resin that is cured by an ester, the working properties of the foundry shape may be undesirably, or even unacceptably low, even though the binder system itself has desirable advantages. These working properties include tensile strength, work time and strip time.

Accordingly, it has been a long-felt need and unmet objective to improve the working properties of ester-cured phenolic-bonded foundry shapes that use reclaimed aggregate.

SUMMARY

These and other objectives are met by a foundry mix composition that comprises a water-based binder; a liquid co-reactant for curing the binder; an appropriate foundry aggregate; and an amount of halloysite tubes. In such a system, the binder is kept separate from the liquid co-reactant, the foundry aggregate and the halloysite tubes until the time for use.

In some embodiments, the appropriate foundry aggregate is a sand, particularly, a mechanically-reclaimed sand.

In many of the embodiments, the halloysite tubes are present in an amount in the range of between about 1 and about 3 weight %, based on the total weight of the appropriate foundry aggregate and the halloysite tubes. In these, the water-based binder comprises an aqueous alkaline phenolic resole resin, present in the range of between about 1 and about 2 weight %, based on the total weight of the appropriate foundry aggregate and the halloysite tubes.

In many embodiments, the liquid co-reactant comprises an ester, present in the range of about 20 to about 30 weight % based on the weight of the water-based binder.

Other aspects of the invention are achieved by a no bake process for preparing a foundry shape. An appropriate amount of the foundry mix composition is provided. The halloysite tubes are intimately mixed with the appropriate foundry aggregate. The liquid co-reactant and the water-based binder are sequentially added to mixture of the halloysite tubes and the foundry aggregate, resulting in a foundry molding compound that is placed and shaped in a pattern, where the combined ingredients are allowed to cure into a foundry shape, which is removed from the pattern.

DETAILED DESCRIPTION OF THE EMBODIMENTS

Novaset

NOVASET™ is the trademark used by ASK Chemicals LLC for a family of no-bake binder systems. The NOVASET binders are alkaline phenolic "no bake" (APNB) systems. The water-based resins are considered to be ideal for steel castings, especially large scale casting applications, but the properties of the binder can make sand reclamation a challenge. For that reason, it is considered an ideal candidate for testing an additive to serve as an answer to the problem presented above.

One of the NOVASET family members is NOVASET HP binder. It is a commercially available aqueous alkaline phenolic resole resin sold by ASK Chemicals LLC. The resin is a phenol-formaldehyde base catalyzed resole condensate prepared by reacting phenol, paraformaldehyde, and water in the presence of dilute alkali hydroxide bases at elevated temperatures. The resin has a solids content of about 50-55% percent and a viscosity of about 30-60 centipoise at 25° C. The resin also contains 0.5-1.0% parts by weight (pbw) of a silane, based on the weight of the resin.

The resin is cured with an ester co-reactant. The specific co-reactant used with the NOVASET HP binder is commercially-available as NOVASET 6020 COREACTANT from ASK Chemicals LLC. It consists mostly of triacetin, also known as glycerin triacetate, and minor amounts of lactones, carbonates, and glycol acetates.

In the experiments reported below, the binder system was not treated as a variable, as the focus was on the effects of the DRAGONITE-HP halloysite nanotubes on the molding properties, especially with regard to reclaimed refractory.

DRAGONITE-HP

In general, halloysite is an aluminosilicate clay exhibiting a rare, naturally occurring hollow tubular structure. Halloysite tubes have a length in the range of 0.5-3.0 microns, an exterior diameter in the range of 50-70 nanometers and an internal diameter (lumen) in the range of 15-30 nanometers. The tubes are known for their high aspect ratio. Halloysite is known as a non-toxic and environment friendly mineral. Its chemical structure is identical to commonly used kaolin clay ($Al_2Si_2O_5(OH)_4 \times nH_2O$), but it is structured with one layer of water molecules existing between an outer layer of silica and an inner layer of alumina. This provides surfaces that are oppositely charged.

According to data from Applied Minerals, Inc., of Brooklyn, N.Y., the producers of the commercially-available DRAGONITE® products, their DRAGONITE-HP product boosts modulus and yield strength of a polymer matrix significantly when it is used as a filler. Applied Minerals indicates that a DRAGONITE-HP is useful as a high-performance additive for engineering thermoplastics when used at loadings of just 1-3%.

Experimental Protocol

In each set of experiments, portions of the sand for each test were weighed out. In at least some cases, the weighed sand was placed in an oven and kept at 90° F. (32° C.) overnight. At the time of the experiment, the ambient temperature and relative humidity were recorded. The weighed sand was transferred to a bowl. A depressed area was formed at the middle of the sand in the bowl, for placement of the co-reactant, which was mixed with the sand for 1 minute before any binder was added. At about one-half way into the mixing time, the mixture was flipped and the mixing continued. After the mixing of co-reactant with the sand, another depression was made in the mixture for the addition of the binder. As with the co-reactant, the binder was mixed into the mixture for 1 minute, flipping at about 30 seconds. The times measured for work time and strip time were based upon the end of the mixing of binder with the co-reactant and sand. The mixture was then flipped onto a metal mold. A depression was made in the molded mixture to assure tight packing of the sand. A hammer was used to press the sand mixture into the mold. Excess mixture was transferred onto a wooden circular mold, packed tightly in the center, covered and smashed thoroughly with a hammer. A metal straight edge was used to remove excess mixture.

It is well-known, for example, as taught by U.S. Pat. No. 5,616,631, to Kiuchi, that "no-bake" binders tend to have low curing rates and low initial strength. This can result in poor utilization of a mold or pattern. As used herein, the time required to allow the cured mold to be removed from the mold is referred to generally as the "strip time." Measured quantitatively, strip time is the time elapsed between placing the mixed binder and sand components into a formed foundry shape and when the foundry shape attains a level of 90 as measured on the Green Hardness "B" scale, using the gauge sold by Harry W. Dietert Co, of Detroit, Mich. This method is taught, for example, in commonly-owned U.S. Pat. No. 6,602,931 to Chen, which is incorporated by reference herein for that teaching.

Another term used in the prior art and in this specification is "work time." In this case, the work time is the time elapsed until the foundry shape attains a level of 60 on the Green Hardness "B" scale, again using the gauge from Dietert. In terms more applicable to the foundry, the "work time" defines the approximate time during which the sand mix can be effectively worked in forming the mold. The difference between strip time and work time is, therefore, an amount of dead time during which the mold being formed cannot be worked upon, but cannot yet be removed from the pattern. Thus, the difference between 1 and the ratio of work time to strip time is a dimensionless number in which 0 represents a material that has no dead time and 1 represents a material where there is no work time. Accordingly, a lower number is preferred, as it means less dead time.

The testing of work time and strip times requires repetitive testing, preferably at regular intervals, using the hardness gauge described above. At the beginning of a test, the hardness gauge is tested for accuracy against a hard surface, such as a piece of glass. In making the tests on a mold, the probe of the gauge should not be used more than once at any location on the mold.

Tensile strength is also an important feature of the foundry shape made using a foundry mix. Test cores were made from the mixed binder and sand, as specified below. For tensile strength testing, the foundry mix was compacted into a dogbone-shaped corebox, with the resulting test specimens ("dogbones") being tested for tensile strength at one hour, three hours and at twenty-four hours after removal from the corebox.

Experiment Set 1

In a first set of experiments, the aggregate tested was new WEDRON-40 sand containing DRAGONITE-HP halloysite as an additive. The binder system was NOVASET HP-A as Part I with NOVASET 6020 COREACTANT as Part II. Across this set of experiments, Part I was added at 1.5% by weight based on sand (BOS), and Part II was added at 25% by weight based on binder (BOB). Four levels of DRAGONITE-HP were tested: no additive (to establish a base), 0.5% by weight BOS, 1% by weight BOS and 2% by weight BOS. Work time and strip time were determined. Four dogbones were tested for tensile strength at each level of halloysite additive, at 1 hr, 3 hrs and 24 hrs. Each set of four data points were averaged, and the averages are presented. The experiment set was conducted at a room temperature of 23° C. and a relative humidity of 31%.

TABLE 1

| Experiment | 1A | 1B | 1C | 1D |
| --- | --- | --- | --- | --- |
| Part I binder (wt % BOS) | 1.5 | 1.5 | 1.5 | 1.5 |
| Part II co-reactant (wt % BOB) | 25 | 25 | 25 | 25 |
| Halloysite (wt % BOS) | 0 | 0.5 | 1 | 2 |
| Work time (min) | 20 | 17 | 18 | 22 |
| Strip time (min) | 30 | 27 | 30 | 35 |
| 1-(WT/ST) | 0.33 | 0.37 | 0.4 | 0.37 |
| TENSILE STRENGTH (psi) | | | | |
| 1 hr | 19 ± 1 | 16 ± 2 | 8 ± 0 | 4 ± 1 |
| 3 hr | 41 ± 5 | 38 ± 3 | 16 ± 1 | 8 ± 2 |
| 24 hr | 88 ± 13 | 72 ± 5 | 34 ± 9 | 19 ± 2 |

It is seen above that addition of the DRAGONITE-HP halloysite, even at 0.5 wt % BOS, causes a drop in both work time and strip time, but that these recover and, at 2 wt % BOS, even exceed the work and strip times when there is no additive. However, the tensile strength declines consistently as the DRAGONITE-HP content increases. This may be attributable to a variety of factors, including the fact that the amount of Part I binder is based on sand and not on total refractory (sand+halloysite). In the data, the dimensionless feature 1-(WT/ST) represents the portion of the strip time when the mold or form is effectively useless.

Experiment Set 2

In a second set of experiments, the aggregate tested was also new WEDRON-40 sand containing DRAGON ITE-HP halloysite as an additive. As in the first set of experiments, the binder system was NOVASET HP-A as Part I with NOVASET 6020 COREACTANT as Part II. Across this set of experiments, Part I was added at 1.5% by weight based on refractory (BOR), and Part II was added at 25% by weight based on binder (BOB). Four levels of DRAGONITE-HP were tested: no additive (to establish a base), 1% by weight based on refractory (BOR), 2% by weight BOR and 3% by weight BOR. The change of basis from BOS to BOR was made because, at 3% by weight halloysite in the sand, the amount of halloysite in the prepared foundry mix starts to be significant when compared to the weight of the Part I binder. Work time and strip time were determined. Four dogbones were tested for tensile strength at each level of halloysite additive, at 1 hr, 3 hrs and 24 hrs. Each set of four data points were averaged, and the averages are presented. The experiment set was conducted at a room temperature of 23° C. and a relative humidity of 40%.

TABLE 2

| Experiment | 2A | 2B | 2C | 2D |
|---|---|---|---|---|
| Part I binder (wt % BOR) | 1.5 | 1.5 | 1.5 | 1.5 |
| Part II co-reactant (wt % BOB) | 25 | 25 | 25 | 25 |
| Halloysite (wt % BOR) | 0 | 1 | 2 | 3 |
| Work time (min) | 15 | 12 | 14 | 12 |
| Strip time (min) | 17 | 17 | 16 | 15 |
| 1-(WT/ST) | 0.12 | 0.29 | 0.12 | 0.2 |
| TENSILE STRENGTH (psi) | | | | |
| 1 hr | 31 ± 4 | 36 ± 4 | 37 ± 2 | 36 ± 2 |
| 3 hr | 59 ± 5 | 77 ± 4 | 75 ± 3 | 66 ± 6 |
| 24 hr | 132 ± 8 | 141 ± 10 | 157 ± 5 | 149 ± 13 |

In this data set, the dimensionless feature 1-(WT/ST) is seen to be consistent, except for Experiment 2B, which appeared to have a low work time. More importantly, the 1 hr tensile strengths were consistent as halloysite content increased and the 3 hr and 24 hr tensile strengths increased, contrary to what was observed in Experiment Set 1.

Experiment Set 3

A third set of experiments was conducted to assess the effects of DRAGONITE-HP on tensile strength, work time and strip time when mechanically reclaimed sand from a commercial foundry was used instead of new WEDRON-40 sand. The reclaimed sand used in this experiment set was treated with an amount of an aqueous slurry of NOVA-THERM A40, which contains about 40 wt % fly ash and is commercially available from ASK Chemicals LLC. The slurry was used at 2 wt % BOS. The process for reclaiming the sand is described in US published application 2007/0173550 to Busby, which is incorporated by reference as if fully recited herein. After the reclaiming process, the material was sieved and de-dusted before the addition of DRAGONITE-HP halloysite at one of four levels: a base case (no additive), 1%, 2% and 3%, in each case BOR.

As in the second set of experiments, the binder system was NOVASET HP-A as Part I with NOVASET 6020 COREACTANT as Part II, with Part I added at 1.5% by weight BOR, and Part II was added at 25% by weight BOB. Work time and strip time were determined. Four dogbones were tested for tensile strength at each level of halloysite additive, at 1 hr, 3 hrs and 24 hrs. Each set of four data points were averaged, and the averages are presented. The experiment set was conducted at a room temperature of 23° C. and a relative humidity of 31%.

TABLE 3

| Experiment | 3A | 3B | 3C | 3D |
|---|---|---|---|---|
| Part I binder (wt % BOR) | 1.5 | 1.5 | 1.5 | 1.5 |
| Part II co-reactant (wt % BOB) | 25 | 25 | 25 | 25 |

TABLE 3-continued

| Experiment | 3A | 3B | 3C | 3D |
|---|---|---|---|---|
| Halloysite (wt % BOR) | 0 | 1 | 2 | 3 |
| Work time (min) | 14 | 14 | 13 | 13 |
| Strip time (min) | 24 | 23 | 20 | 20 |
| 1-(WT/ST) | 0.42 | 0.39 | 0.35 | 0.35 |
| TENSILE STRENGTH (psi) | | | | |
| 1 hr | 12 ± 1 | 17 ± 2 | 17 ± 2 | 21 ± 2 |
| 3 hr | 38 ± 5 | 39 ± 4 | 40 ± 3 | 45 ± 2 |
| 24 hr | 65 ± 8 | 72 ± 11 | 76 ± 4 | 83 ± 8 |

The use of the DRAGONITE-HP additive in the 0 to 3 wt % BOR range with reclaimed sand instead of new sand provided very good results. There was slight improvement in the dimensionless strip time feature, but tensile strength, at each time, increased as the halloysite content increased.

Experiment Set 4

A fourth set of experiments was conducted to assess the effects of DRAGONITE-HP on tensile strength, work time and strip time when mechanically reclaimed sand from a commercial foundry was used instead of new WEDRON-40 sand. In a first experiment in this set, the reclaimed sand was used as received, with no DRAGONITE-HP halloysite added, as a first base case. In the subsequent four experiments in the set, the mechanically reclaimed sand was treated with an amount of an aqueous slurry of NOVA-THERM A40, which contains about 40 wt % fly ash and is commercially available from ASK Chemicals LLC. The slurry was used at 2 wt % BOS. The process for reclaiming the sand is described in US published application 2007/0173550 to Busby, which is incorporated by reference as if fully recited herein. After the reclaiming process, the material was sieved and de-dusted before the addition of DRAGONITE-HP halloysite at one of four levels: a base case (no additive), 1%, 2% and 3%, in each case BOR.

As in all of the prior experiments, the binder system was NOVASET HP-A as Part I with NOVASET 6020 COREACTANT as Part II, and, as in all experiments except Set 1, Part I was added at 1.5% by weight BOR, and Part II was added at 25% by weight BOB. Work time and strip time were determined. Four dogbones were tested for tensile strength at each level of halloysite additive, at 1 hr, 3 hrs and 24 hrs. Each set of four data points were averaged, and the averages are presented. The experiment set was conducted at a room temperature of 23° C. and a relative humidity of 58%.

TABLE 4

| Experiment | 4A | 4B | 4C | 4D | 4E |
|---|---|---|---|---|---|
| Part I binder (wt % BOR) | 1.5 | 1.5 | 1.5 | 1.5 | 1.5 |
| Part II co-reactant (wt % BOB) | 25 | 25 | 25 | 25 | 25 |
| Halloysite (wt % BOR) | 0 | 0 | 1 | 2 | 3 |
| Work time (min) | 20 | 17 | 13 | 13 | 10 |
| Strip time (min) | 29 | 27 | 26 | 18 | 17 |
| 1-(WT/ST) | 0.31 | 0.37 | 0.5 | 0.28 | 0.41 |
| TENSILE STRENGTH (psi) | | | | | |
| 1 hr | 15 ± 1 | 28 ± 1 | 27 ± 1 | 26 ± 1 | 24 ± 1 |
| 3 hr | 30 ± 7 | 44 ± 4 | 49 ± 2 | 46 ± 2 | 39 ± 3 |
| 24 hr | 65 ± 7 | 109 ± 8 | 112 ± 7 | 106 ± 2 | 99 ± 6 |

In this experiment set, Experiment 4A represent reclaimed sand as received without any pretreatment and Experiment 4B represents reclaimed sand that was treated and fluidized, as described above, with no halloysite in either case. While similar results were observed, the fluidization was seen as a positive effect. Halloysite was then increased in Experiments 4C to 4E. The combined effects of the pretreatment and the addition of halloysite are seen in both tensile strength and in a reduced strip time, which means that a given mold can be reused more times in a given work period.

What is claimed is:

1. A foundry mix composition, comprising:
a water-based binder;
a liquid co-reactant for curing the binder;
a foundry aggregate; and
an amount of halloysite tubes;
wherein the binder is kept separate from the liquid co-reactant, the foundry aggregate and the halloysite tubes until the time for use.

2. The composition of claim 1, wherein:
the water-based binder comprises an aqueous alkaline phenolic resole resin, present in the range of between about 1 and about 2 weight %, based on the total weight of the foundry aggregate and the halloysite tubes.

3. The composition of claim 1, wherein:
the liquid co-reactant comprises an ester, present in the range of about 20 to about 30 weight % based on the weight of the water-based binder.

4. The composition of claim 1, wherein:
the halloysite tubes are present in an amount in the range of between about 1 and about 3 weight %, based on the total weight of the foundry aggregate and the halloysite tubes.

5. The composition of claim 4, wherein:
the water-based binder comprises an aqueous alkaline phenolic resole resin, present in the range of between about 1 and about 2 weight %, based on the total weight of the foundry aggregate and the halloysite tubes.

6. The composition of claim 5, wherein:
the liquid co-reactant comprises an ester, present in the range of about 20 to about 30 weight % based on the weight of the water-based binder.

7. The composition of claim 1, wherein:
the foundry aggregate is a sand.

8. The composition of claim 7, wherein:
the halloysite tubes are present in an amount in the range of between about 1 and about 3 weight %, based on the total weight of the foundry aggregate and the halloysite tubes.

9. The composition of claim 8, wherein:
the water-based binder comprises an aqueous alkaline phenolic resole resin, present in the range of between about 1 and about 2 weight %, based on the total weight of the foundry aggregate and the halloysite tubes.

10. The composition of claim 9, wherein:
the liquid co-reactant comprises an ester, present in the range of about 20 to about 30 weight % based on the weight of the water-based binder.

11. The composition of claim 7, wherein:
the sand is a mechanically-reclaimed sand.

12. The composition of claim 11, wherein:
the halloysite tubes are present in an amount in the range of between about 1 and about 3 weight %, based on the total weight of the foundry aggregate and the halloysite tubes.

13. The composition of claim 12, wherein:
the water-based binder comprises an aqueous alkaline phenolic resole resin, present in the range of between about 1 and about 2 weight %, based on the total weight of the foundry aggregate and the halloysite tubes.

14. The composition of claim 13, wherein:
the liquid co-reactant comprises an ester, present in the range of about 20 to about 30 weight % based on the weight of the water-based binder.

15. A no bake process for preparing a foundry shape comprising the steps of:
providing an appropriate amount of the foundry mix composition of claim 1;
mixing intimately the halloysite tubes with the foundry aggregate;
preparing a foundry molding compound by separately mixing the liquid co-reactant and the water-based binder with the mixed halloysite tubes and foundry aggregate;
inserting the foundry molding compound into a pattern, allowing the mixture to cure into a foundry shape, and removing the foundry shape from the pattern.

* * * * *